United States Patent
Morcel

(10) Patent No.: US 7,340,056 B2
(45) Date of Patent: *Mar. 4, 2008

(54) REMOTE DEACTIVATION OF DECODERS FOR ACCESSING MULTIMEDIA DIGITAL DATA

(75) Inventor: Stéphane Morcel, Rennes (FR)

(73) Assignee: Thomson Licensing, Boulogne Billancourt (FR)

( * ) Notice: Subject to any disclaimer, the term of this patent is extended or adjusted under 35 U.S.C. 154(b) by 809 days.

This patent is subject to a terminal disclaimer.

(21) Appl. No.: 10/680,605

(22) Filed: Oct. 7, 2003

(65) Prior Publication Data

US 2004/0123128 A1 Jun. 24, 2004

(30) Foreign Application Priority Data

Oct. 11, 2002 (FR) .................................. 02 12657

(51) Int. Cl.
*H04N 7/167* (2006.01)
*H04L 9/32* (2006.01)

(52) U.S. Cl. ...................................... 380/239; 713/193
(58) Field of Classification Search .................. None
See application file for complete search history.

(56) References Cited

U.S. PATENT DOCUMENTS

| 4,716,588 | A | 12/1987 | Thompson et al. | ........... 380/20 |
|---|---|---|---|---|
| 5,345,505 | A | 9/1994 | Pires | ............................ 380/20 |
| 5,815,722 | A * | 9/1998 | Kalwitz et al. | .............. 717/178 |
| 6,970,960 | B1 * | 11/2005 | Sarfati | ........................ 710/106 |
| 7,069,449 | B2 * | 6/2006 | Weaver et al. | .............. 713/193 |
| 2002/0161997 | A1 * | 10/2002 | Yamasaki et al. | ........... 713/150 |
| 2003/0135747 | A1 * | 7/2003 | Jaquier | ....................... 713/193 |

FOREIGN PATENT DOCUMENTS

| EP | 0140705 | 5/1985 |
|---|---|---|
| EP | 0140705 A2 | 5/1985 |
| WO | WO00/16557 | 3/2000 |
| WO | WO 01/03341 | 1/2001 |
| WO | WO 01/03421 | 1/2001 |
| WO | WO 00/16557 | 3/2002 |

* cited by examiner

*Primary Examiner*—Nasser Moazzami
*Assistant Examiner*—Pramila Parthasarathy
(74) *Attorney, Agent, or Firm*—Joseph J. Laks; Paul P. Kiel

(57) ABSTRACT

The invention relates to a process for the remote deactivation of at least one decoder for accessing multimedia digital data, which is provided by a service operator. The decoder has a unique identifier (ID) known to the operator. To deactivate a decoder with determined identifier (ID), the operator sends, through a communication network linking the decoder to the operator, a destruction command for destroying all or part of the software embedded in the decoder, this destruction command being addressed to the decoder with determined identifier (ID). The invention also relates to a decoder which comprises an eraser software module suitable for erasing all or part of the software embedded in the decoder when the decoder receives a destruction command which is addressed to it.

7 Claims, 4 Drawing Sheets

REMOTE DEACTIVATION OF DECODERS FOR ACCESSING MULTIMEDIA DIGITAL DATA

This application claims the benefit under 35 U.S.C. §119(a) of French patent application No. 02/12657 filed Oct. 11, 2002.

BACKGROUND OF THE INVENTION

1. Field of the Invention

The present invention relates to the field of the fight against the pirating of decoders for accessing multimedia digital data. It relates more particularly to a process for the remote deactivation of such a decoder as well as to a decoder comprising means of remote deactivation.

2. Description of the Related Art

The operators broadcasting pay audiovisual programmes customarily provide the users who wish to receive these programmes with decoders allowing them to access the same by paying a subscription. The digital data constituting the programmes are indeed usually transmitted in encrypted form so that the users who do not have the decoder cannot access the same. The decoder contains in particular means for decrypting and for decoding the digital data. More precisely, the decoder generally comprises a chip card reader into which is inserted a card which contains a software module as well as one or more cryptographic keys necessary for the decrypting of the data. The chip card also generally contains information regarding the rights acquired by the user of the decoder (for example which channels are accessible to the user, for what duration, etc.).

When a user no longer wishes to pay to receive the programmes from an operator, he must in principle return his decoder to the operator or to an intermediary in charge of installing the decoders. Operators are nevertheless being increasingly confronted with a problem of pirating of their decoders. Indeed, certain users suspend their subscription but do not give back their decoder. They subsequently procure pirate chip cards giving extended rights of access to the programmes broadcast by the operator. Certain decoders are even stolen from the installers' vans so as likewise to be used with pirate chip cards.

SUMMARY OF THE INVENTION

The objective of the invention is to solve the aforesaid problems. More precisely, an aim of the invention is to render a stolen or nonreturned decoder unusable or at the very least to greatly impair the operation thereof.

Accordingly, the invention relates to a process for the remote deactivation of at least one decoder for accessing multimedia digital data, which is provided by a service operator, the decoder having a unique identifier known to the operator. The process consists in the operator sending, through a communication network linking the decoder to the operator, a destruction command for destroying all or part of the software embedded in the decoder, this destruction command being addressed to the decoder with unique identifier specified by the operator.

Thus when a decoder is not returned or is stolen, the operator can, remotely, trigger a partial or total destruction of the software which is necessary for the operation of the decoder in such a way as to render it partially or totally unusable.

According to a first embodiment, the communication network used to send the destruction command is a bidirectional network. In this first embodiment, the destruction command is sent only to the decoder to which it is addressed.

According to a second embodiment, the communication network used to send the destruction command is a monodirectional network. Preferably, it is the network for broadcasting the data from the operator to all the decoders and the destruction command is sent to all the decoders with the data broadcast by the operator.

The invention also relates to a decoder for accessing multimedia digital data, characterized in that it comprises an eraser software module suitable for erasing all or part of the software embedded in the decoder when the decoder receives a destruction command which is addressed to it.

According to a particular characteristic of the invention, the decoder possesses a unique identifier and the destruction command received contains this unique identifier when the command is addressed to it.

According to another aspect of the invention, the decoder comprises a module for initializing the decoder intended for verifying the integrity of the embedded software and, in the event of negative verification, for downloading new software. This initialization module is furthermore suitable for verifying that a part at least of the software embedded in the decoder has not previously been erased by the eraser module, the initialization module verifying the integrity of the embedded software only when no part of the software has previously been erased.

According to a particular embodiment, the eraser module erases a software module embedded in the decoder with each receipt of a new destruction command addressed to the decoder.

According to a particular characteristic of this embodiment, the software modules of the decoder are erased in the following order: the access control module first, the user interface module second, and the audio/video decoding module third.

BRIEF DESCRIPTION OF THE DRAWINGS

The invention will be better understood on reading the description which follows, given merely by way of example and while referring to the appended drawings in which.

DESCRIPTION OF THE PREFERRED EMBODIMENTS

Figure 1:
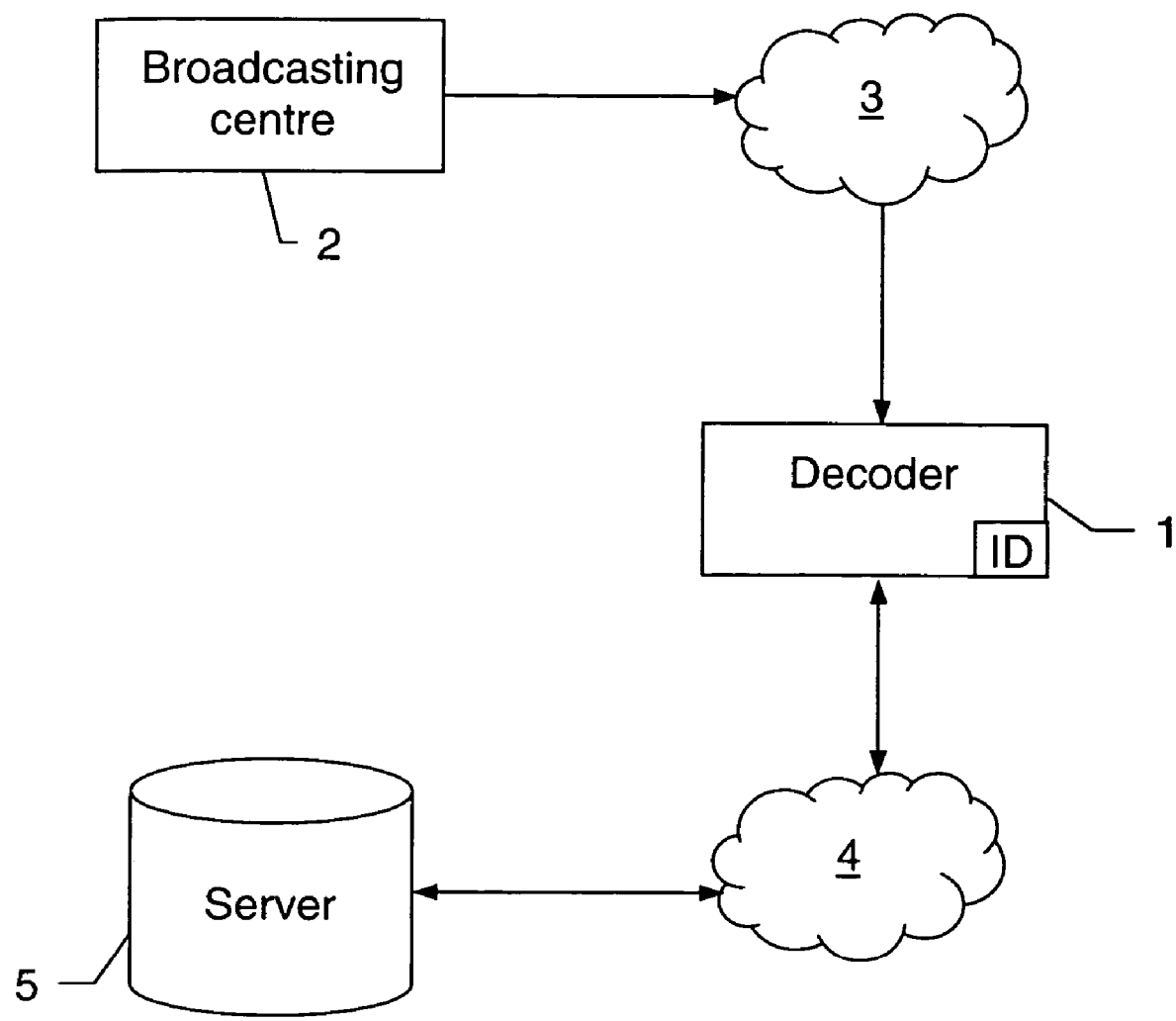
FIG. 1 represents an assembly for transmitting and receiving programmes provided by an operator.
Figure 2:
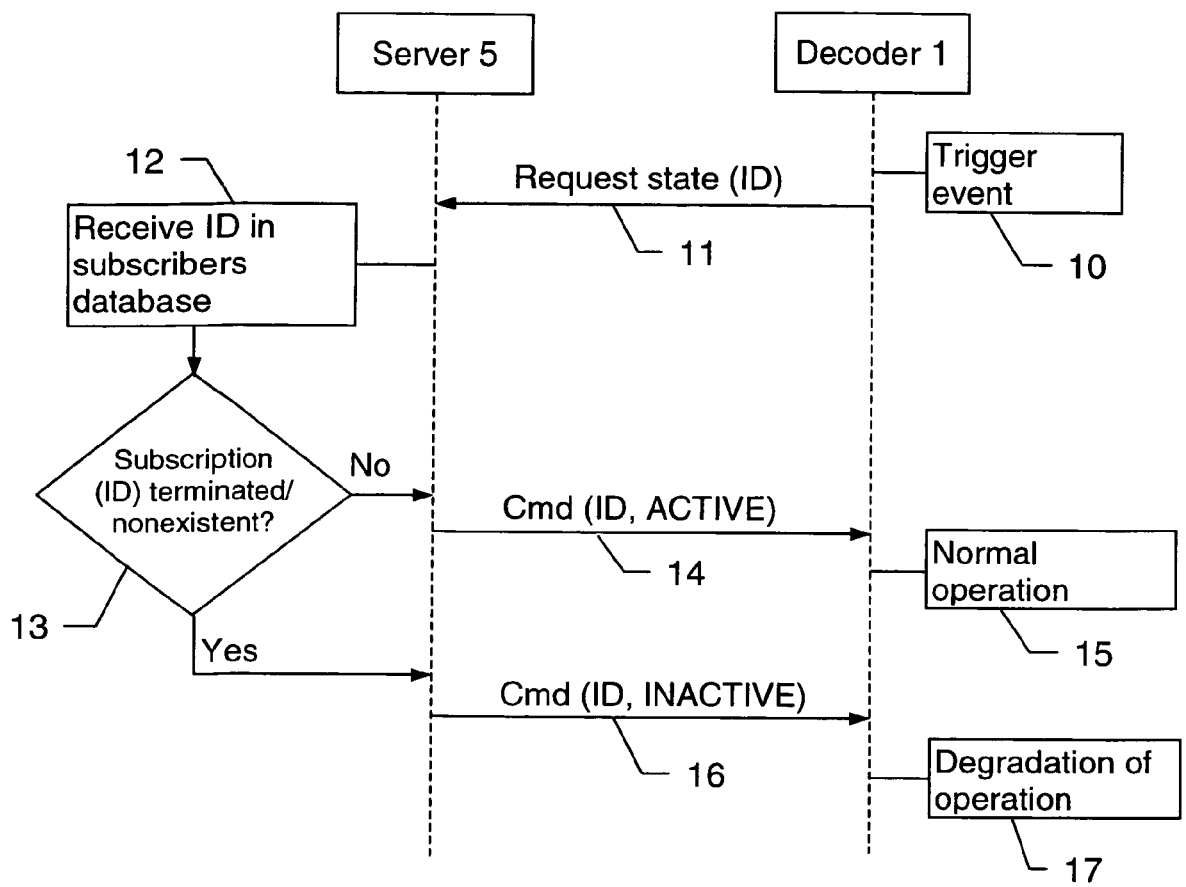
FIG. 2 diagrammatically illustrates a first embodiment of the invention.

Represented in FIG. 1 is a decoder 1 which receives programmes, typically audiovisual programmes or interactive programmes, from an operator's broadcasting centre 2. It receives these programmes by way of a unidirectional broadcasting network 3. This broadcasting path is often spoken of as simply the "broadcast path". The decoder 1 is also linked to a server 5 of the operator by a bidirectional communication network 4. One generally speaks of the "return path" linking the decoder to the server. Naturally, even if only one decoder with identifier ID is represented in FIG. 2, there is in practice a multitude of decoders with different identifiers which receive programmes from the broadcasting centre 2 and which are linked to the server 5.

Customarily, the broadcast path is used for the general broadcasting of programmes, that is to say for global broadcasting to all the decoders at the same time, while the return path is used for individual communications from a decoder to the operator. The return path is in particular used within the context of interactive programmes when the user is participating in a game or in a vote or indeed to order programmes according to a "pay-per-view" mode.

The broadcast path is effected in the form of a transmission by satellite, by cable or over the airwaves.

To effect the return path, the decoder 1 comprises a modem (not represented in FIG. 1) linked to a communication network 4. This may be a conventional telephone modem linked to the STN (acronym standing for Switched Telephone Network), or else an ADSL (acronym standing for Asymmetric Digital Subscriber Line) modem linked to a conventional telephone line, or else a cable modem linked to a cabled network. It may also preferably be a modem with no wire connection linked to a wireless communication network, for example a modem of GPRS (acronym standing for General Packet Radio Service), GSM (acronym standing for Global System for Mobile communications) or UMTS (acronym standing for Universal Mobile Telecommunication System) type.

Each decoder possesses a unique identifier ID which is preferably stored in a protected area of a memory contained in the decoder. All the identifiers ID of the decoders provided by an operator to its users are also stored in a database of the operator. When a user no longer pays his subscription but does not return his decoder with identifier ID, or else when the operator learns that a decoder with identifier ID has been stolen, the operator can then, in accordance with the invention, send a destruction command to destroy all or part of the software embedded in the decoder, this command being addressed specifically to the decoder with identifier ID.

The sending of the specific command for destroying the software of a decoder can be performed in two possible ways: either via the return path, or via the broadcast path.

We shall firstly describe, in conjunction with FIG. 2, the embodiment using the return path. This embodiment advantageously allows a bidirectional dialogue between the decoder and the remote server.

FIG. 2 illustrates the process steps implemented in the decoder 1 and the server 5 as well as the commands exchanged between the two devices.

Each time a trigger event occurs, as is represented by step 10 in FIG. 2, the decoder interrogates the remote server by transmitting a command "Request State (ID)", sent in step 11, to ascertain its operating state. A trigger event may be an exiting of the standby mode of the decoder, the powering up of the decoder, the connecting of the modem of the decoder to the bidirectional network 4, or else a specific trigger event arising at regular intervals (at least once a day).

In step 12, the identifier ID of the decoder, dispatched as parameter of the command sent in step 11, is received in the database of the subscribers of the operator. A test is then performed in step 13 to verify whether the subscription associated with the decoder with identifier ID has or has not been terminated. If the subscription is current, that is to say if the user of the decoder 1 is up to date with the payment of his subscription, then the response to test 13 is "NO" and the server 5 returns a command "Cmd (ID, ACTIVE)" to the decoder 1 during step 14. The decoder then enters a normal mode of operation in step 15.

If on the other hand the subscription associated with the decoder 1 has been terminated or else if no subscription has been registered by the operator in respect of a decoder with identifier ID, then the response to test 13 is "YES" and the server sends during a step 16 a command "Cmd (ID, INACTIVE)" to the decoder 1. When it receives this command, the decoder 1 then enters a mode of degradation of its operation illustrated by step 17. In this degraded mode, the software embedded in the decoder is destroyed, totally or partially according to an embodiment which will be described subsequently.

It will be noted that when this embodiment is used, it is preferable to envisage equipping the decoders with connectionless modems (of GPRS, GSM or UMTS type) so that "pirate" users cannot sidestep this attack by quite simply disconnecting their modem.

The second embodiment, which should be used preferably in parallel with the first embodiment for greater security, uses for its part the so-called "broadcast" path.

According to the principle of this embodiment, the operator broadcasts, together with the video and audio streams, commands for destroying all or part of the software embedded in the decoders whose subscriptions have been terminated and that have not been returned to the operator or for which no subscription has ever been taken out.

Figure 3:
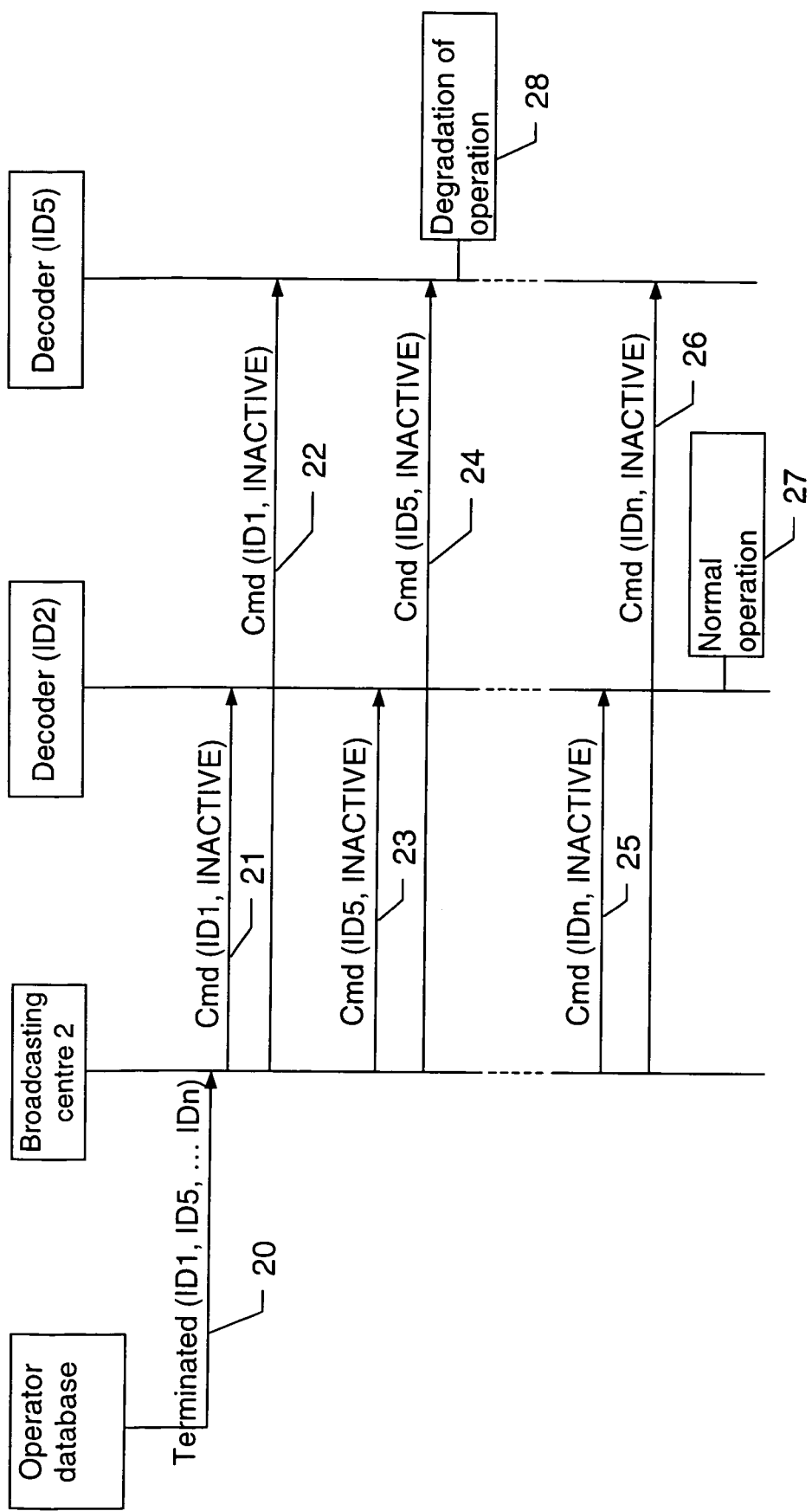
FIG. 3 diagrammatically illustrates a second embodiment of the invention which may be associated with the first embodiment and FIG. 4 is a diagrammatic flow chart of a process for operating a decoder according to the invention.

FIG. 3 diagrammatically illustrates the operations performed according to this embodiment.

The broadcasting centre 2 of the operator regularly receives from the database of the operator a message 20 "Terminated (ID1, ID5, . . . , IDn)" containing the identifiers ID1, ID5, . . . , IDn of all the decoders whose software is to be destroyed totally or partially. Destruction commands are then generated for each of the identifiers ID1, ID5, . . . , IDn and are thereafter broadcast by the broadcasting centre 2 together with the audio/video data to all the decoders of the operator.

In FIG. 3, we have represented two decoders whose identifiers are respectively ID2 and ID5. These two decoders receive all the destruction commands 21 to 26 and they filter the identifiers contained in the parameters of the destruction commands so as to verify whether they correspond to their own identifier or not.

As the decoder with identifier ID2 does not receive any destruction command comprising its identifier, it continues its normal mode of operation 27.

When the decoder with identifier ID5 receives the destruction command 24 containing ID5 in its parameters, it recognizes its own identifier and then enters a mode of degradation of its operation 28.

The manner of carrying out the degradation of the functionalities of the decoder when the latter receives a destruction command according to one of the above embodiments will now be described in greater detail.

According to the principle of the invention, when a decoder with identifier ID receives a destruction command containing the identifier ID in its parameters, the decoder erases all or part of its embedded software. This erasure is performed by a software module that we shall call the "eraser", which is added to the conventional software modules of a decoder and whose function is to erase a part or all of the software existing in the decoder.

Figure 4:
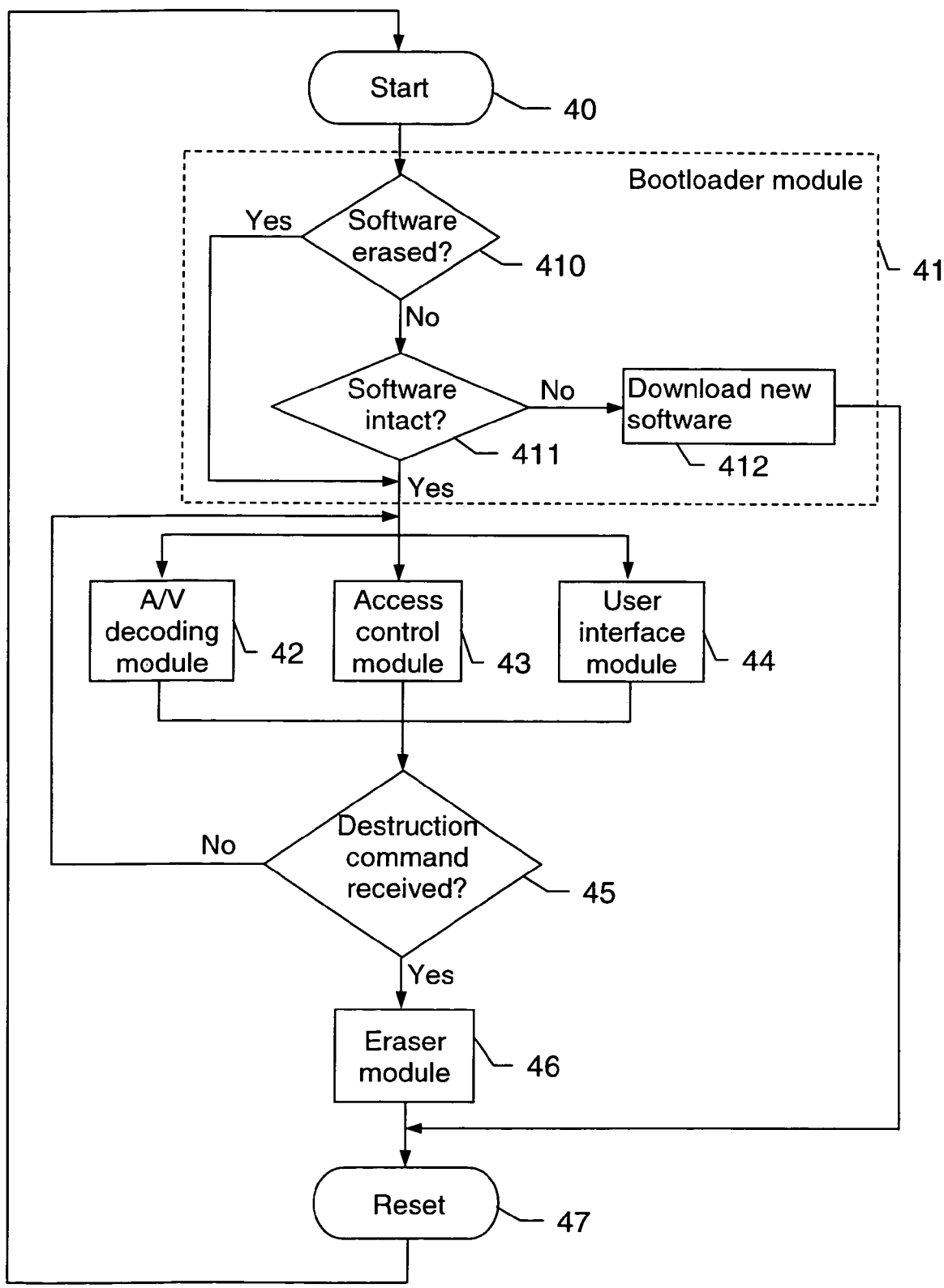

In FIG. 4 we have represented in the form of a diagrammatic flowchart the manner of operation of a decoder. The start 40 occurs when the decoder exits its "standby" mode. A "Bootloader" module 41 is then called. The customary task of this module is to verify the integrity of the software of the decoder and to download new software in the case where the software is no longer intact. According to the invention, a new functionality is added to it which consists in verifying beforehand that the software has not been erased by the eraser module.

Thus, in step 410, a test is performed to verify whether a part at least of the software has not been erased by the eraser module. If the response to this test is negative, a test 411 is performed to verify the integrity of the software present. If the latter is not intact, then the "Bootloader" module downloads new software in step 412 and the process continues with a "reset" of the decoder (step 47) which consists in turning off the decoder properly (intelligent shutdown of the software modules, resetting of the RAM memory to zero, etc). It will also be noted that the "reset" of the decoder causes a switch to "standby" mode and an automatic exit from this "stand-by" mode.

When the test 411 reveals that the software is intact or when the test 410 reveals that at least part of the software has been erased, the process continues by calling the software modules allowing nominal operation of the decoder.

The audio/video decoding module 42 is in charge of decoding the digital data representing the audio and the video. The access control module 43 is in charge on the one hand of verifying whether the decoder can access the audio/video data constituting the programme as a function of the rights acquired by the user (for example as a function of his subscription), and on the other hand of descrambling the audio/video data if the programme received is scrambled (or "encrypted" in the common terminology). The User Interface module 44 is for its part in charge of navigating through the menus of the decoder, in particular for choosing the programmes or adjusting the parameters of the decoder.

It will be noted that when part of the software has been erased, naturally the module corresponding to this part is not called.

The three modules 42, 43 and 44 operate in parallel under the supervision of a real time "Operating System" (OS) (not represented) which allocates timeslots to them for operation.

During nominal operation of the decoder, a test 45 is also implemented to verify whether a destruction command (such as the command dispatched in step 16 of FIG. 2 or the commands 21 to 26 of FIG. 3) has been received by the decoder. If the response to this test is negative, then the nominal operation of the decoder continues.

On the other hand, if the response to test 45 is positive, an "Eraser" software module 46 is called to destroy all or part of the software embedded in the decoder. The process continues thereafter with a "reset" of the decoder (step 47), this step 47 itself looping back to the start step 40.

The erasure of the embedded software by the Eraser module 46 can be complete or gradual. Decoder software is composed chiefly of four parts that are stored in a Flash memory of the decoder:

protected modules (for example the "Bootloader" module or the "Eraser" module) that are stored in a protected area of the Flash memory, that is to say in an area that can be erased only in the factory;

an audio/video decoding module (such as the module 42);

an access control module (such as the module 43); and a user interface module (such as the module 44).

The audio/video decoding, access control and user interface modules are stored for their part in an erasable and rewriteable area of the Flash memory. They may indeed be updated by downloading new software as performed in step 412 of FIG. 4.

According to the principle of the invention, when the Eraser module is called, it erases, either completely or gradually, the software modules stored in the erasable part of the memory.

Preferably, one begins by erasing the access control module. Thus, the user no longer has access to the scrambled programmes. He can only access programmes transmitted as plaintext.

In this case there will be provision to display an explicit message to the user informing him of the ensuing destruction of his decoder if he does not take out a new subscription with the operator.

If a new destruction command is received because the user persists in not taking out a subscription, then the user interface module is erased secondly, this depriving the user of any possibility of "hopping" and of navigating through the menus.

Finally, lastly, the audio and video decoding module is erased, placing the decoder out of service.

Naturally the software modules may be erased in a different order from that just described. If software embedded in a decoder comprises modules other than those described, they may also be erased progressively.

The invention claimed is:

1. Decoder for accessing multimedia digital data, comprising:

an eraser software module suitable for erasing all or part of the software embedded in said decoder when the decoder receives a destruction command which is addressed to it; and an initialization module for initializing the decoder, and for verifying the integrity of the embedded software and, in the event of negative verification, for downloading new software, and further for verifying that a part, at least of the software embedded in the decoder, has not previously been erased by the eraser software module, wherein said initialization module verifying the integrity of the embedded software only when no part of the software has previously been erased according to a destruction command.

2. Decoder for accessing multimedia digital data possessing a unique identifier, comprising:

an eraser software module suitable for erasing all or part of the software embedded in said decoder when the decoder receives a destruction command containing said unique identifier; and an initialization module for initializing the decoder, and for verifying the integrity of the embedded software and, in the event of negative verification, for downloading new software, and further for verifying that a part, at least of the software embedded in the decoder, has not previously been erased by the eraser software module, wherein said initialization module verifying the integrity of the embedded software only when no part of the software has previously been erased according to a destruction command.

3. Decoder according to claim 1, wherein the eraser software module erases a software module embedded in the decoder with each receipt of a new destruction command addressed to the decoder.

4. Decoder according to claim 3, further comprising an access control module, a user interface module and an audio/video decoding module, in which modules are erased in the following order:

the access control module first, the user interface module second, and
the audio/video decoding module third.

5. Decoder according to claim 1, wherein said decoder receives the destruction command through a wireless interface.

6. A computer readable medium embodying a software product for controlling a decoder, which when executed on a processor causing the process of:
   verifying the integrity of embedded software and, in the event of negative verification, for downloading new software;
   erasing all or part of software embedded in a decoder when the decoder receives a destruction command which is addressed to the decoder; and
   verifying that a part, at least of the software embedded in the decoder, has not previously been erased upon receiving a destruction command,
   wherein said verifying the integrity of the embedded software will execute only when no part of the software has previously been erased according to a destruction command.

7. The computer readable medium according to claim 6, wherein said erasing is performed on one of a plurality of embedded software modules, and upon receipt of each destruction command another one of the plurality of embedded software modules is erased.

* * * * *